United States Patent
Frings et al.

(10) Patent No.: US 6,350,849 B1
(45) Date of Patent: Feb. 26, 2002

(54) POLYESTERS WHICH CONTAIN MALEATE GROUPS

(75) Inventors: Rainer B. Frings; Gerwald F. Grahe, both of Berlin (DE); Shinichi Nonaka, Osaka (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/631,835

(22) Filed: Aug. 3, 2000

(30) Foreign Application Priority Data

Aug. 5, 1999 (EP) ............................................. 99115073

(51) Int. Cl.⁷ ..................... C08G 63/83; C08G 63/42; C08G 63/66
(52) U.S. Cl. ..................... 528/281; 528/297; 528/306
(58) Field of Search ................................ 528/281, 297, 528/492, 503

(56) References Cited

U.S. PATENT DOCUMENTS

| | | | |
|---|---|---|---|
| 3,538,043 A | * | 11/1970 | Herold |
| 5,019,643 A | * | 5/1991 | Bagrel et al. |
| 5,278,120 A | * | 1/1994 | Eling et al. |
| 5,409,764 A | * | 4/1995 | Otsuki et al. |

* cited by examiner

*Primary Examiner*—Tae H. Yoon
(74) *Attorney, Agent, or Firm*—Armstrong, Westerman & Hattori, LLP

(57) ABSTRACT

The production is described of unsaturated polyesters, which exclusively contain maleate groups in their main chain, by the ring-opening polymerization of epoxides, such as glycidyl ethers, glycidyl esters and olefine epoxides, with $\alpha,\beta$-unsaturated anhydrides, preferably such as maleic anhydride, both on their own and in admixture with other cyclic anydrides, in the presence of a $Zn^{2+}$ carboxylate. The polyesters which are thus produced are characterized by high molecular weights and a narrow molecular weight distribution. Polymerization can be effected between 50 and 120° C., but is preferably effected between 60 and 90° C., either in the melt or in a solvent. Unsaturated reactive thinners, which after the addition of suitable radical initiators react thermally or photochemically with the polyesters to form lacquers, cast parts or fiber-reinforced composite materials, can also be employed as solvents. The preferred crosslinking agents for the polyesters are mono- and polyfunctional acrylates, methacrylates, vinyl ethers and vinyl esters. The polyesters can also be completely or partially isomerized, either thermally or by catalysis, to form polyesters which comprised fumarate groups in their main chain.

9 Claims, No Drawings

POLYESTERS WHICH CONTAIN MALEATE GROUPS

FIELD OF THE INVENTION

This invention relates to a method of producing polyesters which comprise maleate groups in their main chain.

BACKGROUND OF THE INVENTION

Polyesters which comprise unsaturated groups within their main chain constitute a class of reactive polymers which are very important industrially for numerous fields of application. Thus they are used, optionally after further modification, as styrene-containing solutions for lacquers, printing inks and adhesives, and are used in particular as casting resins for the production of fibre-reinforced components of all types.

They are produced by the condensation polymerisation of mixtures of saturated and unsaturated cyclic anhydrides, or of the corresponding dicarboxylic acids, with diols and optionally with small amounts of polyols at high temperatures, under basic or acidic catalysis. A multiplicity of polyesters can be produced by correspondingly selecting the condensation polymerisation conditions and the type and composition of the materials used. Maleic anhydride, maleic acid or fumaric acid are essentially used as the unsaturated component.

As a consequence of the condensation polymerisation conditions, the major part of the maleate esters which are incorporated by condensation isomerises to form fumarate ester groups. Hitherto, this was even desirable, and the aim was to effect isomerisation as completely as possible, since the aromatic vinyl compounds., preferably styrene, which were used almost exclusively as reactive thinners, copolymerise significantly more rapidly with fumarates than with maleates.

The choice of diols is also restricted to just a few compounds, such as ethylene glycol, propylene glycol-1,2 and oligoethers thereof, and to longer chain branched diols, such as neopentyl glycol and 2,2,4-trimethylpentanediol-1, 3, which are added in small amounts. Diols which contain methyl groups are required so that the polyesters dissolve in styrene and in order to improve the material properties of the finished products.

A review of the chemistry and uses of unsaturated polyesters is give, for example, by A. Fradet and P. Arlaud in Comprehensive Polym. Sci., Volume 5, pages 331 to 344 (1989), and by T. J. Mao in the Encyclopedia of Polymer Science and Engineering, Volume 15, pages 167 to 178 (1989).

For many areas of application, it is necessary to replace styrene, which is very volatile and constitutes an industrial health hazard, by other less volatile reactive thinners which constitute less of an industrial health hazard. Acrylates, methacrylates, vinyl ethers and vinyl esters are suitable reactive thinners. In contrast to styrene, however, these compounds exhibit a significantly lower reactivity for polymerisation with fumarate groups, and often copolymerise or crosslink better with maleates. Thus WO 90/10660 describes the photochemical, radical-initiated curing of polyesters, which comprise terminal maleate groups, by polyfunctional vinyl ethers, wherein the polyesters are produced in a multi-stage reaction.

DD 256516 relates to the formation of low molecular weight bismaleic acid monoesters from maleic anhydride and diols of symmetrical structure under defined reaction conditions. Products of this type are solid, difficultly soluble, and contain terminal acidic groups via which they can be reacted further, but where there is a risk of isomerisation of the double bond.

It is also known that polyesters can be formed from maleic anhydride and simple epoxides, preferably epichlorohydrin, propylene oxide and butylene oxide. This reaction has been described by Akimoto et al. in J. of Polym. Sci., Volume 11, page 2247 et seq. (1973), by W. Kuran et al. in PL 121261, and by R. Herold in U.S. Pat. No. 3,538,043, for example, and is based on the ring-opening polymerisation of epoxides with anhydrides, as described by J. Luston and F. Vass in Adv. in Polym. Sci., Volume 56, page 91 et seq. (1984).

Examples of initiators which are used for polymerisation reactions of this type include alkali metal salts, halides, complex salts and acetylacetonates of transition metals, or tertiary amines, often in combination with diols, polyether diols or dicarboxylic acids. A common feature of reactions which employ initiators such as these is the restriction thereof to short-chain olefine epoxides. In no case is there any mention of the configuration of the double bonds in the main chain.

Moreover, with all these known initiators it is not possible to prevent the formation of homopolymers of the epoxides used.

In contrast, V. Bagrel et al. in U.S. Pat. No. 5,019,643 describe the formation of alternating polyesters from cyclic dicarboxylic anhydrides and epoxides which comprise at least 8 carbon atoms, in the presence of Ti(IV) diketone—complexes in hydrocarbons. In contrast to alkali metal salts, tertiary amines and N-heterocycles, it is claimed that these complex catalysts are capable of preventing the complex secondary reactions which occur between maleate double bonds and the aforementioned initiators, particularly alkali metal salts or tertiary amines. However, due to the restriction to epoxides comprising 8 or more carbon atoms which is cited in the above patent, it is obviously not possible to incorporate short-chain epoxides by polymerisation,

SUMMARY OF THE INVENTION

The underlying object of the present invention is to provide a simple method of producing polyesters which exclusively contain maleate groups in their polymer chain. The object is also to provide polyesters of this type which exhibit greater variability as regards different side groups compared with conventional polyesters, which practically only contain methyl side groups. It should thereby be possible to vary the dissolution properties and reactivity of polymers with reactive thinners and the mechanical properties of the resulting crosslinked products within wide limits.

The present invention relates to a method of producing polyesters comprising maleate groups in their main chain, which is characterised in that a mixture comprising a) one or more α,β-unsaturated anhydrides, selected from the group consisting of maleic anhydride, maleic anhydride derivatives, and precursors of maleic anhydride and maleic anhydride derivatives which are converted into maleic anhydride or maleic anhydride derivatives during polymerisation, b) one or more epoxides comprising 2 to 25 carbon atoms, wherein the ratio of the amount of epoxide or epoxides to the amount of anhydrides cited in a) and b) is at least 1:1, preferably further a-2) one or more aromatic, cycloaliphatic or aliphatic carboxylic anhydrides, most preferably up to 99-mol % of the anhydrides with respect to the total amount of components a) and a-2), is copolymerised in the presence of 0.01 to 5 mol-% of a $Zn^{2+}$ carboxylate with respect to the total amount of anhydride(s) and epoxide(s), at a temperature from 50 to 120° C.

DETAILED DESCRIPTION OF THE INVENTION

The invention is based on the surprising observation that zinc(II) carboxylates are suitable initiators for the ring-opening polymerisation of saturated and unsaturated cyclic anhydrides with epoxides of all types, wherein the number of carbon atoms in the epoxides can be between 2 and 25, preferably between 4 and 18.

Examples of α,β-unsaturated anhydrides which can be used in the method according to the invention include maleic anhydride, methylmaleic anhydride (citraconic anhydride), dimethylmaleic anhydride and phenylmaleic anhydride. Apart from the aforementioned maleic anhydrides, precursors of maleic anhydrides or precursors of maleic anhydride derivatives which are converted into maleic anhydride or maleic anhydride derivatives during polymerisation can also be used in the method according to the invention. One example thereof is itaconic anhydride, which during polymerisation is converted practically completely into methylmaleic anhydride, which is incorporated as such by polymerisation.

In addition, one or more aromatic, cycloaliphatic or aliphatic carboxylic anhydrides, preferably up to 99 mol-% of components a) and a-2) with respect to the total amount of the aforementioned α,β-unsaturated anhydrides or s anhydride derivatives, can be used in the method according to the invention. It is desirable that the amount of α,β-unsaturated anhydrides then correspondingly ranges from 1 to 100%. It is also possible to produce a polyester which comprise saturated and unsaturated recurring units by using components a-2).

Examples of aromatic, cycloaliphatic or aliphatic carboxylic anhydrides such as these include succinic anhydride, glutaric anhydride, 2,2-dimethylglutaric anhydride, 1,2,3,6-tetrahydrophthalic anhydride, 3- and 4-methyl-1,2,3,6-tetrahydrophthalic anhydride, 7-bicyclohept5-ene-2,3-dicarboxylic anhydride (nadic anhydride), methylnadic anhydride, cyclohexane-1,2-dicarboxylic anhydride, phthalic anhydride, allylsuccinic anhydride, 2-isobutenylsuccinic anhydride, 2-octenylsuccinic anhydride and 2-dodecenylsuccinic anhydride.

The epoxides which are used in particular in the method according to the invention are olefine epoxides, glycidyl ethers and glycidyl esters comprising 2 to 25, preferably 4 to 18, carbon atoms.

Examples of suitable olefine epoxides include, amongst others: ethylene oxide, propylene oxide, butylene oxide, 1,2-epoxyhexane, cyclohexene oxide, 1,2-epoxy-octane, 1,2-epoxytetradecane, 1,2-epoxyoctadecane, 3-(perfluoro-3-methyl-butyl)-1,2-epoxypropane, 3-perfluorohexyl-1,2-epoxypropane, and 3-perfluoro-octyl-1,2-epoxypropane.

Examples of suitable glycidyl ethers include: methyl glycidyl ether, allyl glycidyl ether, n- and iso-propyl glycidyl ethers, n- and iso-butyl glycidyl ethers, n-hexyl glycidyl ether, 2-ethylhexyl glycidyl ether, octyl glycidyl ether, decyl glycidyl ether, 1,1,2,2-tetrafluoroethyl glycidyl ether, 2,2,3,3-tetrafluoropropyl glycidyl ether, 3-(1H,1H,9H-hexadecafluoro-nonyl) glycidyl ether, phenyl glycidyl ether, glycidyl ethers of ethoxylated phenol which comprise 2 to 10 ethylene oxide units in their chain, cresyl glycidyl ether, 4-tert.-butylphenyl glycidyl ether, 4-methoxyphenyl glycidyl ether, naphthyl-1-glycidyl ether and 2,4-dibromophenyl glycidyl ether.

Examples of glycidyl esters which can be used include glycidyl acetate, glycidyl propionate, glycidyl pivalate, glycidyl neononanoate, glycidyl neodecanoate, glycidyl neododecanoate, glycidyl benzoate and glycidyl esters of mixtures of unsaturated fatty acids.

Branched, unsaturated polyesters can also be produced by the method according to the invention by using 0.01 to 2 mol-%, with respect to the total amount of the epoxy/anhydride mixture, of a di- or polyfunctional epoxide, preferably of a di- or polyglycidyl ether.

Examples of di- and polyfunctional epoxides for the production of branched, unsaturated polyesters include: 1,4-butanediol diglycidyl ether, 1,6-hexanediol diglycidyl ether, neopentyl glycol diglycidyl ether, polyethylene-, polypropylene- and polytetramethylene glycol diglycidyl ethers which comprise 1 to 60 recurring ether units in their chain, trimethylolpropane triglycidyl ether, pentaerythritol tetraglycidyl ether, bisphenol-A-diglycidyl ether, adipic acid diglycidyl ester and the three isomers of benzenedicarboxylic acid diglycidyl ester.

As aforementioned, the use of 2 mol-% or less of di- and polyfunctional epoxides results in preventing crosslinking during polymerization and is therefore desirable.

In the method according to the invention, the amount of epoxide must be at least equivalent to the total amount of anhydride which is used. The preferred anhydride/epoxide ratio falls within the range from 1:1.1 to 1:5. One significant advantage of the method according to the invention is that the initiator which is used therein initiates copolymerisation only, and does not initiate epoxide homopolymerisation Any unreacted epoxide which remains can subsequently be removed from the reaction product by distillation under vacuum.

Depending on the epoxy/anhydride ratio, it is possible to produce polyesters which constitute strictly alternating polyesters, or those which comprise short polyether sequences in their main chain. Polyesters of this type can be produced particularly advantageously in the melt or in unreactive solvents by treatment with 0.01 to 5 mol-% Zn carboxylate at temperatures from 50 to 120° C., most preferably from 60 to 90° C. At room temperature, the polyesters which are thus formed constitute highly viscous to solid resins, which are soluble in all customary organic solvents and unsaturated monomers and in reactive thinners. The molecular weights which are obtained by the method according to the invention correspond to number average values $M_N$ between 1500 and 10,000 g/mol and to weight average values $M_W$ between 2000 and 20,000 g/mol. The low extents of molecular heterogeneity $M_W/M_N$; for the polyesters, which range from 1.3 to 2.5, are noteworthy, and are far lower than the corresponding values for polyester condensation polymers. The exclusive formation of maleate groups in the polymer chain can be detected by $^1H$ NMR spectroscopy. Whereas the protons of fumarate double bonds give a signal at 6.85 ppm, the $^1H$ signals for the polyesters obtained by the method of production according to the invention are exclusively located at 6.2 ppm, corresponding to those of low molecular weight dialkyl maleates. The exclusive formation of maleate double bonds in the polyesters produced according to the invention can thus be proved.

In the method according to the invention, 0.01 to 5 mol-% of a $Zn^{2+}$ carboxylate, with respect to the total amount of anhydride(s) and epoxide(s), is used as the polymerisation initiator. Examples of $Zn^{2+}$ carboxylates such as these include Zn acetate, Zn butyrate, Zn isobutyrate, Zn cyclohexanobutyrate, Zn 2-ethylhexanoate (Zn octoate), Zn neodecanoate, Zn stearate and Zn naphthenate. The use of Zn octoate and Zn neodecanoate is particularly advantageous. These compounds can be obtained as solutions in aromatic solvents with different metal contents, the $Zn^{2+}$ carboxylate content of which can range between 45 and 60% by weight. Data on the amount of initiator used are always given here with respect to the amount of active Zn salt in the solutions.

In the method according to the invention, components a) and b), further a-2) are either melted at a temperature of 50 to 90° C. or are dissolved or homogenised in a solvent which is inert to anhydride and epoxy groups. This is 1 s followed by the addition of the aforementioned $Zn^{2+}$ carboxylate in an amount of 0.01 to 5 mol-% with respect to the total amount of anhydride and epoxide, followed by polymerisation for 3 to 8 hours at temperatures from 50 to 120° C., preferably 60 to 90° C., until complete conversion of the anhydride is obtained.

According to one preferred embodiment of the method according to the invention, a mixture comprising one or more cyclic anhydrides, wherein at least one anhydride must contain a double bond in conjugation with the carbonyl groups and wherein maleic anhydride is particularly preferred, and 1 to 5 equivalents of one or more epoxides, is heated to a temperature of 50 to 90° C. with stirring and under a protective gas, whereupon a homogeneous liquid mixture is formed.

0.01 to 5 mol-% of the $Zn^{2+}$ carboxylate in a solvent is then added to this melt, which is subsequently polymerised at temperatures from 50 to 120° C., preferably 60 to 90° C., until the anhydride which is used has been completely converted. Complete conversion can be detected by suitable methods of analysis, such as titration of the anhydride or IR spectroscopy. Polymerisation lasts for between 3 and 10 hours.

If anhydride components are used, such as phthalic anhydride for example, which do not melt within the aforementioned temperature range, polymerisation is nevertheless possible since components such as these react completely in the course of the polymerisation process. If readily volatile epoxides are used, such as ethylene oxide, propylene oxide and butylene oxide, the boiling points of which are below the temperature range for polymerisation, polymerisation can be conducted in a pressure vessel, either under the inherent pressure of the low-boiling epoxide or under an inert gas pressure of 2 to 20 bar, such as $N_2$ for example. After polymerisation is complete, any residual epoxide which remains is distilled off, optionally under vacuum.

The unsaturated polyesters which are thus obtained are substances of medium to high viscosity and have number average molecular weights $M_N$ between 2 and 10,000 g/mol and weight average molecular weights $M_W$ from 2500 to 18,000 g/mol. The extents of heterogeneity $M_W/M_N$ are between 1.3 and 2.5 and are thus considerably lower than the corresponding values which are obtained by the synthesis of unsaturated polyesters by condensation polymerisation.

In principle, the method according to the invention can also be conducted in a solvent which dissolves all the constituents of the monomer mixtures. Polar solvents which do not react with anhydrides or epoxides are advantageous for this purpose, such as ethers, esters, acid amides or sulphoxides. The preferred solvents are dioxane, ketones such as methyl isobutyl ketone and methyl isoamyl ketone, glycol ether acetates such as ethyl and n-butyl glycol acetate, N,N-dimethylformamide, N,N-dimethylacetamide and dimethylsulphoxide. A solvent can either be used on its own, or a mixture of a plurality of suitable solvents can be used.

In this variant, the mixture, which consists of at least one epoxide and one or more anhydrides, wherein at least one anhydride must contain a double bond in conjugation with the carbonyl groups, and wherein maleic anhydride is particularly preferred, is dissolved in the solvent at temperatures from 20 to 60° C., is treated with 0.01 to 5 mol-% of the $Zn^{2+}$ carboxylate in a solvent, and is subsequently polymerised, with stirring and within the preferred temperature range from 60 to 90° C., until the amount of anhydride used has been completely converted. The content of non-volatile polyester in said solutions can range between 5 and 75% by weight, preferably between 20 and 65% by weight.

In one particularly preferred variant of this solvent polymerisation technique, polymerisation of the polyester is conducted in one or more suitable liquid unsaturated compound(s) which serve as reactive thinners for the subsequent radical-initiated crosslinking of these resin solutions.

Thus the present invention further relates to a method of producing a resin mixture comprising the polyester produced by the methods according to claims 1 to 5 and one or more unsaturated reactive thinners which can be copolymerised by a radical mechanism, which is characterised in that 5 to 90% by weight, with respect to the total weight of the mixture, of components a) to b), preferably further a-2), as defined in claim 1 or 2 is dissolved in 10 to 95% by weight of the reactive thinner or reactive thinners at a temperature from 20 to 60° C. and is treated with 0.01 to 5 mol-% of a $Zn^{2+}$ carboxylate with respect to the total amount of components a) to b), preferably further a-2), and is subsequently polymerised at a temperature from 50 to 120° C.

Examples of reactive thinners such as these include methacrylates such as methyl and butyl methacrylate, acrylates such as butyl and 2-ethylhexyl acrylate, vinyl ethers such as isobutyl vinyl ether, 2-ethylhexyl vinyl ether or cyclohexanemethanol vinyl ether, or vinyl esters such as vinyl pivalate, vinyl neononanoate and vinyl neodecanoate. In addition to simple unsaturated compounds, di- and polyfunctional unsaturated reactive thinners from the aforementioned groups can be used as polymerisation solvents, or methacrylates, acrylates, vinyl ethers or vinyl esters can be used as polymerisation solvents, either in admixture with monofunctional solvents or on their own. Esters of maleic acid, such as dimethyl, diethyl or dibutyl maleate, and esters of fumaric acid, such as dimethyl, diethyl or dibutyl fumarate, can also be contained in these unsaturated reactive thinners in amounts of 5 to 50% by weight. Aromatic vinyl compounds, such as styrene or vinyltoluene for example, can be used in principle as reactive thinners but are less suitable, since they crosslink considerably more slowly by a radical mechanism with polyesters which contain maleate groups than with condensation polymers which contain fumarate groups. They can, however, partly replace one or more of the aforementioned reactive thinners, in amounts from 1 to 25% by weight.

Polyester polymerisation in unsaturated reactive thinners is conducted in the same manner as that described for solution polymerisation. To prevent premature crosslinking, polymerisation is conducted under a protective gas such as $N_2$, and with the addition of 50 to 2000 ppm of one or more inhibitors known in the art, such as phenothiazine, hydroquinone or 2,6-di-tert.-butyl-4-methylphenol for example. The solids content of resin mixtures of this type can range from 10 to 90% by weight, and is particularly advantageously between 30 and 60% by weight. The molecular weight distributions of polymers produced in this manner are similar to those of comparable resins which are polymerised in the melt.

Mixtures of polyesters produced according to the invention in said unsaturated reactive thinners and in mixtures thereof, wherein the polyester content can range between 5 and 90 by weight and is advantageously between 20 and 75% by weight, can be crosslinked by suitable radical initiators, either thermally between 0 and 150° C., or photochemically, to form lacquers, cast parts or fibre-reinforced composites, wherein methods, fillers and additives which are known in the art can be used. When low volatile acrylates, methacrylates, vinyl ethers or vinyl esters are used as reactive thinners, optionally in admixture with 5 to 40% by weight of one or more esters of maleic or fumaric acid, the emissions which occur during the crosslinking of styrene-containing polyester mixtures can be effectively reduced. The initiator system which is described in European Patent Application 97 101 532.6 is particularly suitable for crosslinking mixtures of this type at temperatures between 0 and 60° C.

Solutions of polyesters according to the invention in mono- and polyfunctional acrylates or vinyl ethers, wherein the polyester content can range between 5 and 90% by weight, preferably between 20 and 50% by weight, can also be crosslinked by UV light to form lacquers, by the addition of 0.5 to 10% by weight of suitable photoradical initiators The maleate polyesters which are produced by the method according to the invention in the melt or in a suitable high-boiling solvent can be converted into fumarate polyesters. Therefore, the present invention further relates to a method of isomerising polyesters which comprise maleate groups in their main chain to form polyesters which comprise fumarate groups in their main chain, which is characterised in that the polyesters produced by the methods according to claims 1 to 4, which comprise maleate groups in their main chain, are subjected to a temperature from 150 to 220° C., or are subjected to a temperature from 100 to 200° C. in the presence of 0.05 to 5% by weight, with respect to the amount of the polyesters, of a catalyst.

Examples of suitable catalysts which are known in the art include morpholine, N-methylmorpholine, piperidine and piperazine, as well as thiourea, KBr, KCl or LiCl, which are also used in order to increase the fumarate content of unsaturated polyester condensation polymers.

Isomerisation is effected after the actual formation of the polyester, wherein the resin, optionally after the addition of an isomerisation catalyst, is heated within the aforementioned temperature range until the desired fumarate content, preferably 100%, is reached. The conversion of the isomerisation process is monitored by means of $^1$H NMR, as explained above.

It is also possible, however, to obtain any desired maleate/fumarate ratios depending on the reaction time or temperature. Compared with those which are produced by condensation polymerisation, the advantage of polyesters which contain fumarate groups and which are produced in this manner is that different side groups, preferably long chain linear or branched alkyl radicals and aryl radicals, can be introduced into polyesters of this type via the epoxide component which is used, preferably aliphatic and aromatic glycidyl ethers and esters, whereby the solubility, viscosity and reactivity of polyesters of this type can be influenced, particularly in styrene, but also in other suitable reactive thinners, and the application properties of the crosslinked products can also be influenced thereby. After reaction, polyesters which are isomerised in the melt can be dissolved in 5 to 95% by weight, preferably in 40 to 60% by weight, of an aromatic vinyl compound, such as styrene, vinyltoluene or 4-tert.-butylstyrene, and after the addition of radical initiators, fillers and additives known in the art can be thermally crosslinked to form lacquers, cast parts or fibre-reinforced composites.

The invention is explained in more detail by means of the following examples:

EXAMPLE 1

A mixture of 2.7 g maleic anhydride and 6.9 g neodecanoic acid glycidyl ester was reacted with 0.2 g Zn octoate solution (Zn concentration 8% in xylene) for 6 hours at 90° C., with stirring, in a 50 ml round-bottom flask fitted with a magnetic stirrer rod. A colourless, viscous resin was formed in the course of this procedure. Residual anhydride was not detected by IR spectroscopy, and the residual epoxy concentration was 0.1 mol-% as determined by an epoxy titration according to DIN 53 188. According to a $^1$H NMR measurement, the double bonds in the main chain were exclusively maleate double bonds. The molecular weights, as determined by GPC in THF, corresponded to Mn=4000 g/mol, Mw=7000 g/mol,

EXAMPLE 2

A mixture of 2.9 g maleic anhydride and 7.8 g butyl glycidyl ether was reacted with 0.4 g Zn octoate solution (Zn concentration 8% in xylene) for 6 hours at 90° C., with stirring, in a 50 ml round-bottom flask fitted with a magnetic stirrer rod. A slightly yellow, viscous resin was formed in the course of this procedure. Anhydride and epoxy titrations performed on this resin gave 0.1 mol-% residual anhydride and 4.5 mol-% residual epoxide. According to a $^1$H NMR measurement, the double bonds in the main chain were exclusively maleate double bonds. The molecular weights, as determined by GPC in THF, corresponded to Mn=2600 g/mol, Mw=5700 g/mol.

EXAMPLE 3

A mixture of 2.3 g maleic anhydride and 6.7 g butyl glycidyl ether was reacted with 0.5 g Zn octoate solution (Zn concentration 8% in xylene) for 6 hours at 60° C., with stirring, in a 50 ml round-bottom flask fitted with a magnetic stirrer rod. A slightly yellow, viscous resin was formed in the course of this procedure. Anhydride and epoxy titrations performed on this resin gave 1.3 mol-% residual anhydride and 6.5 mol-% residual epoxide. The double bonds in the main chain were exclusively maleate double bonds. The molecular weights, as determined by GPC in THF, corresponded to Mn=4150 g/mol, Mw=7700 g/mol.

EXAMPLE 4

A mixture of 11.1 g maleic anhydride, 55.5 g phthalic anhydride and 65 g butyl glycidyl ether was reacted with 4.2 g Zn octoate solution (Zn concentration 8% in xylene) for 4 hours at 95° C., with stirring, in a 250 ml round-bottom flask fitted with a magnetic stirrer rod. A colourless, viscous resin was formed in the course of this procedure. Residual anhydride was not detected by IR spectroscopy, and the residual epoxy concentration was 5.3 mol-% as determined by an epoxy titration. The double bonds in the main chain were exclusively those of maleate groups. The molecular weights, as determined by GPC in THF, corresponded to Mn=1300 g/mol, Mw=1900 g/mol.

EXAMPLE 5

A mixture of 11.1 g maleic anhydride, 58.5 g tetrahydrophthalic anhydride and 68 g butyl glycidyl ether was reacted with 4.2 g Zn octoate solution (Zn concentration 8% in xylene) for 24 hours at 95° C., with stirring, in a 250 ml round-bottom flask fitted with a magnetic stirrer rod. A slightly yellow viscous resin was formed in the course of this procedure. Residual anhydride was not detected by IR spectroscopy, and the residual epoxy concentration was 2.0 mol-% as determined by an epoxy titration. The double bonds in the main chain were exclusively those of maleate groups. The molecular weights, as determined by GPC in THF, corresponded to Mn=2100 g/mol, Mw=3800 g/mol.

EXAMPLE 6

A mixture of 51 g maleic anhydride, 57 g glutaric anhydride and 260 g butyl glycidyl ether was reacted with 3 g Zn octoate solution (Zn concentration 12% in xylene) for 6 hours at 90° C., with stirring, in a 1 litre round-bottom flask fitted with a magnetic stirrer rod. A slightly yellow, viscous resin was formed in the course of this procedure. Residual anhydride was not detected by IR spectroscopy, and excess epoxide was distilled off under vacuum. The double bonds in the main chain were exclusively those of maleate groups. The molecular weights, as determined by GPC in THF, corresponded to Mn=2400 g/mol, Mw=5500 g/mol.

EXAMPLE 7

A mixture of 0.49 g maleic anhydride, 0.56 g itaconic anhydride and 2.45 g neodecanoic acid glycidyl ester was reacted with 0.08 g Zn octoate solution (Zn concentration 12% in xylene) for 6 hours at 90° C., with stirring, in a 10 ml test tube fitted with a magnetic stirrer rod. A yellow, very viscous resin was formed in the course of this procedure. Residual anhydride and epoxide could not be detected by analytical methods. The double bonds in the main chain were exclusively those of maleate groups. The molecular weights, as determined by GPC in THF, corresponded to Mn=3160 g/mol, Mw=9400 g/mol.

EXAMPLE 8

A mixture of 9.8 g maleic anhydride, 16.6 g 3 methyltetrahydrophthalic anhydride, 11.4 g allyl glycidyl ether and 27 g neodecanoic acid glycidyl ester was reacted with 1.5 g Zn octoate solution (Zn concentration 12% in xylene) for 8 hours at 90° C., with stirring, in a 100 ml round-bottom flask fitted with a magnetic stirrer rod. A yellow, viscous resin was formed in the course of this procedure. Residual anhydride and epoxide could not be detected by analytical methods. The double bonds in the main chain were exclusively those of maleate groups. The molecular weights, as determined by GPC in THF, corresponded to Mn=2000 g/mol, Mw=4900 g/mol.

EXAMPLE 9

A mixture of 1 g maleic anhydride and 2.45 g neodecanoic acid glycidyl ester was reacted with 0.08 g Zn octoate solution (Zn concentration 12% in xylene) for 6 hours at. 90° C., with stirring and in 3.45 g diethyl maleate as a solvent, in a 10 ml test tube fitted with a magnetic stirrer rod. A yellow, low-viscosity resin was formed in the course of this procedure. Residual anhydride and epoxide could not be detected by analytical methods. The double bonds in the main chain were exclusively those of maleate groups. The resin which was prepared in this manner contained 50% by weight diethyl maleate. The molecular weights, as determined by GPC in THP, corresponded to Mn=4000 g/mol, Mw=5500 g/mol.

EXAMPLE 10

A mixture of 1 g maleic anhydride and 2.45 g neodecanoic acid glycidyl ester was reacted with 0.08 g Zn octoate solution (Zn concentration 12% in xylene) and with 0.007 g 2,6-di-tert.-butyl-4-methylphenol as a radical inhibitor for 6 hours at 90° C., with stirring and in 3.45 g isobutyl vinyl ether as a solvent, in a 10 ml test tube fitted with a magnetic stirrer rod. A yellow, viscous resin was formed in the course of this procedure. Residual anhydride and epoxide could not be detected by analytical methods. The double bonds in the main chain were exclusively those of maleate groups. The resin which was prepared in this manner contained 50% by weight isobutyl vinyl ether. According to GPC in THF, a polymer had been formed which exhibited a bimodal distribution, with peak maxima at 6500 and 4000 g/mol.

EXAMPLE 11

A mixture of 1 g maleic anhydride and 2.5 g neodecanoic acid glycidyl ester was reacted with 0.8 g Zn octoate solution (Zn concentration 12% in xylene) and with 0.007 g 2,6-di-tert.-butyl-4-methylphenol as a radical inhibitor for 6 hours at 90° C., with stirring and in 3.45 g methyl methacrylate as a solvent, in a 10 ml test tube fitted with a magnetic stirrer rod. Residual anhydride and epoxide could not be detected by analytical methods. The double bonds in the main chain were exclusively those of maleate groups. The resin which was prepared in this manner contained 50% by weight methyl methacrylate. The molecular weights of the polymer, as determined by GPC in THF, corresponded to Mn=3000 g/mol, Mw=5000 g/mol.

EXAMPLE 12

A mixture of 1 g maleic anhydride and 2.45 g neodecanoic acid glycidyl ester was reacted with 0.08 g Zn octoate solution (Zn concentration 12% in xylene) for 6 hours at 90° C., with stirring and in 4.5 g methyl methacrylate as a solvent, in a 10 ml test tube fitted with a magnetic stirrer rod. Residual anhydride and epoxide could not be detected by analytical methods. The double bonds in the main chain were exclusively those of maleate groups. The resin which was prepared in this manner contained 50% by weight methyl isobutyl ketone. The molecular weights of the polymer, as determined by GPC in THF, corresponded to Mn=2800 g/mol, Mw=3700 g/mol.

EXAMPLE 13

5 g of the polyester from Example 6 in each case were heated to 180° C. in 10 ml test tubes and were mixed with a.) 0, b.) 0.24 and c.) 1% by weight of piperidine. Samples were taken from each batch after 2, 4 and 6 hours and the conversion of the isomerisation reaction was determined by means of $^1$H NMR spectroscopy in $CDCl_3$, by comparing the integral at 6.2 ppm for the maleate double bond with that at 6.85 ppm for the fumarate double bond.

a.) 2 hours: 3.5%, 4 hours: 5.0%, 6 hours: 16.3% fumarate content, b.) 2 hours: 22.8%, 4 hours: 23.8%, 6 hours: 35.0% fumarate content, c.) 2 hours: 100%, 4 hours: 100%, 6 hours: 100% fumarate content.

What is claimed is:

1. A method of producing polyesters comprising maleate groups in their main chain, characterized in that a mixture comprising
   a) one or more α,β-unsaturated anhydrides, selected from the group consisting of maleic anhydride, 2-substituted maleic anhydride derivatives, 2,3-disubstituted maleic anhydride derivatives, and compounds which are converted into maleic anhydride or one of said maleic anhydride derivatives during polymerization,
   b) one or more epoxides comprising 2 to 25 carbon atoms, wherein the ratio of the amount of epoxide or epoxides to the amount of anhydrides cited in a) is at least 1:1, is copolymerized in the presence of 0.01 to 5 mol-% of a $Zn^{2+}$ carboxylate, with respect to the total amount of anhydride(s) and epoxide(s), at a temperature from 50 to 120° C.

2. A method according to claim 1, characterized in that the mixture further comprises a-2) one or more aromatic, cycloaliphatic or aliphatic carboxylic anhydrides.

3. A method according to claim 1, characterized in that the epoxide/anhydride ratio ranges from 1.1:1 to 5:1.

4. A method according to claim 1, characterised in that polymerisation is conducted in the melt.

5. A method according to claim 1, characterised in that polymerisation is conducted in a solvent which is unreactive to carboxylic acid anhydrides and epoxides, wherein the solids content is from 5 to 75% by weight.

6. A method of producing a resin mixture comprising the polyester produced by the method according to claim 1 or 2 and one or more unsaturated reactive thinners which can be copolymerized by a radical mechanism, characterized in that 5 to 90% by weight, with respect to the total weight of the mixture, of components a) and b) or components a), a-2) and b) as defined in claim 1 or 2, respectively, is dissolved in 10 to 95% by weight of the reactive thinner or reactive thinners at a temperature from 20 to 60° C. and is treated with 0.01 to 5 mol-% of a $Zn^{2+}$ carboxylate with respect to the total amount of components a) and b), and is subsequently polymerized at a temperature from 50 to 120° C.

7. A method of isomerising polyesters which comprise maleate groups in their main chain to form polyesters which comprise fumarate groups in their main chain, characterized in that the polyesters produced by the methods according to claim 1, which comprise maleate groups in their main chain, are subjected to a temperature from 100 to 220° C.

8. A method of producing resin mixtures which are capable of crosslinklng by a radical mechanism, characterized in that 5 to 90% by weight of the polyesters which produced by the method according to claim 1, and which comprise maleate groups in their main chain, are treated with 95 to 10% by weight of one or more unsaturated monomers selected from the group consisting of acrylates, methacrylates, vinyl ethers and vinyl esters, and are treated, with respect to the total amount of the mixture, with 0.01 to 5% by weight of one or more radical initiators.

9. A method of producing resin mixtures which are capable of crosslinking by a radical mechanism, characterized in that 5 to 90% by weight of the polyesters which produced by the method according to claim 7, and which comprise fumarate groups in their main chain, are treated with 95 to 10% by weight of styrene or styrene derivatives, and, are treated with 0.01 to 5% by weight of one or more radical initiators with respect to the total amount of the mixture.

* * * * *